(12) United States Patent
Duvaut et al.

(10) Patent No.: US 7,957,477 B2
(45) Date of Patent: Jun. 7, 2011

(54) SYSTEMS AND METHODS FOR MIMO PRECODING IN AN XDSL SYSTEM

(75) Inventors: Patrick Duvaut, Tinton Falls, NJ (US); Amitkumar Mahadevan, Eastontown, NJ (US); Massimo Sorbara, Freehold, NJ (US); Ehud Langberg, Wayside, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 920 days.

(21) Appl. No.: 11/845,040

(22) Filed: Aug. 25, 2007

(65) Prior Publication Data

US 2008/0049855 A1 Feb. 28, 2008

Related U.S. Application Data (60) Provisional application No. 60/823,633, filed on Aug. 25, 2006, provisional application No. 60/854,742, filed on Oct. 27, 2006, provisional application No. 60/902,764, filed on Feb. 22, 2007, provisional application No. 60/894,847, filed on Mar. 14, 2007.

(51) Int. Cl.
*H04L 27/28* (2006.01)
(52) U.S. Cl. .................................................. 375/260
(58) Field of Classification Search .............. 375/260, 375/232, 346, 267, 347, 349, 229; 370/210, 370/315
See application file for complete search history.

(56) References Cited

U.S. PATENT DOCUMENTS

| | | | |
|---|---|---|---|
| 6,937,623 | B2 | 8/2005 | Cioffi et al. |
| 6,990,196 | B2 | 1/2006 | Zeng et al. |
| 2003/0086362 | A1 | 5/2003 | Hasegawa et al. |
| 2003/0086514 | A1 * | 5/2003 | Ginis et al. ................ 375/346 |
| 2004/0086064 | A1 | 5/2004 | Van Acker et al. |
| 2004/0264559 | A1 | 12/2004 | Cendrillon et al. |
| 2006/0029148 | A1 * | 2/2006 | Tsatsanis .................. 375/267 |
| 2006/0146755 | A1 | 7/2006 | Pan et al. |
| 2007/0014378 | A1 * | 1/2007 | Parhi et al. ................ 375/267 |

OTHER PUBLICATIONS

G. Ginis and J.M. Cioffi, "Vectored Transmission for Digital Subscriber Line Systems," IEEE J. Select. Areas Commun., vol. 20, No. 5, pp. 1085-1124, Jun. 2002.
R. Cendrillon et al., "Improved Linear Crosstalk Precompensation for DSL," in Proc. IEEE ICASSP, May 2004, pp. 1053-1056.
Actelis Networks, "Channel Estimation by 'Abuse' of Receivers," NIPPNAI-098, Savannah, Georgia, 2006.

(Continued)

*Primary Examiner* — Khai Tran
(74) *Attorney, Agent, or Firm* — Thomas, Kayden, Horstemeyer & Risley, LLP (57) ABSTRACT

Systems and methods for off-diagonal MIMO precoders are described. At least one embodiment includes a method for precoding data for transmission in a discrete multi-tone (DMT) xDSL system to cancel self-induced far end crosstalk (self-FEXT) comprising: learning characteristics associated with a plurality of N users within the xDSL system to determine an initial off-diagonal multiple input multiple output (MIMO) precoder (ODMP) for a given tone frequency; and converging towards an optimum ODMP from the initial ODMP in order to cancel downstream self-FEXT for the plurality of N users, wherein the ODMP is represented as a zero diagonal matrix with only off-diagonal terms, and wherein the converging towards the optimum ODMP comprises: maximizing the channel capacity for the plurality of N users for the given tone frequency; and minimizing an increase in transmit power of the xDSL system relative to an original transmit power where a precoder is not active.

20 Claims, 4 Drawing Sheets

OTHER PUBLICATIONS

J. Louveaux and A.J. Van Der Veen, "Error Sign Feedback as an Alternative to Pilots for Tracking of FEXT Transfer Functions in Downstream VDSL," EURASIP J. Applied Signal Processing, vol. 2006, pp. 1-14.

J. Louveaux and A.J. Van Der Veen, "Adaptive DSL Crosstalk Pre-cancellation Design Using Low-Rate Feedback From End Users," IEEE Signal Proc. Letters, vol. 13, No. 11, pp. 665-668, Nov. 2006.

Conexant Systems, "G.vdsl: Using Error Samples for Downstream Self FEXT Cancellation Pre-coding in VDSL2," SD-052, San Diego, California, 2007.

Conexant Systems, "Updated Proposal for Construction of a MIMO Channel Model for Evaluation of FEXT Cancellation Systems," NIPPNAI- 2007-009R1, San Francisco, California, 2007.

Benveniste, Albert, "Adaptive Algorithms for Stochastic Approximations," Springer Verlag, New-York, 1990.

Conexant Systems, "G.vdsl: Proposed Requirements on Back Channel for Estimating MIMO Channel in VDSL2", CD-041, Denver, Colorado, Sep. 25-29, 2006.

E. Karipidis et al., "Crosstalk Models for Short VDSL2 Lines from 30MHz Measured Data", Eurasip Journal on Applied Signal processing, vol. 2006, Article 85859, pp. 1-9.

A. Leshem and L. Youming, "A Low Complexity Coordinated FEXT Cancellation for VDSL" ICECS, Dec. 2004, pp. 338-341.

Upzide labs, "G.vdsl: Using orthogonal pilot sequences for assisting FEXT channel estimation in vector transmission.", ITU SD-036, San Diego, California Jan. 15-19, 2007.

D. P. Palomar, M. A. Lagunas, and J. M. Cioffi, "Optimum Joint Transmit Receive Linear Processing for Vectored DSL Transmission with QoS Requirements", IEEE, 2002.

G. Latsoudas and N. D. Sidoropoulos, "On the Performance of Certain Fixed Complexity Multi-user Detectors in FEXT Limited Vectored DSL Systems," IEEE, 2005.

R. Cendrillon et al., "The Linear Zero-Forcing Crosstalk Canceller is Near Optimal in DSL Channels", Globecom, 2004.

R. Cendrillon et al., "Low Complexity Crosstalk Cancellation Through Line Selection in Upstream VDSL", ICASSP, 2003.

R. Cendrillon et al., "Simplified Power Allocation and TX/RX structure for MIMO-DSL," Globecom, 2003.

R. Cendrillon et al., "Partial Cross Talk Precompensation in Downstream VDSL", Signal processing 2004, pp. 2005-2019. 8.2 MIMO-DSL Patents 8.2.1 Issued.

Actelis Networks, "Notes on FEXT Cancellation Precoding matrices", NIPP-NAI-2006-099, Savannah, Georgia, Jun. 26-29, 2006.

Actelis Networks, "Reporting of Direct Channel Parameters", NIPP-NAI- 2006-100, Savannah, Georgia, Jun. 26-29, 2006.

G.996.1 ITU-T, "Tests Procedures for digital subscribers lines transceivers," Feb. 2001. 8.4 Generic References.

Proakis, John G., "Digital Communications," Third Edition, Mac Graw-Hill Inc., 1995.

Pierrugues, L. "Next Canceller and Clustering Modulation for ADSL Systems," Ph.D Thesis, University of Paris-Cergy, France, Nov. 2005.

ITU-T Recommendation G.992.1—Series G: Transmission Systems and Media Digital Systems and Networks—Digital transmission systems—Digital sections and digital line system—Access Networks; Asymmetric Digital Subscriber Line (ADSL) Transceivers; (Jun. 1999).

International Search Report and Written Opinion, for related PCT Application No. PCT/US2007/076748 mailed Jan. 20, 2011.

Louveaux, et al., "Downstream VDSL Channel Tracking Using Limited Feedback for Crosstalk Precompensated Schemes" proceedings of IEEE ICASSP May 2005, pp. 337-340.

* cited by examiner

SYSTEMS AND METHODS FOR MIMO PRECODING IN AN XDSL SYSTEM

CROSS-REFERENCE TO RELATED APPLICATION

This application claims priority to, and the benefit of, U.S. Provisional Patent Applications entitled, "Small Variations MIMO Precoders SVMP for Downstream FEXT Mitigation," having Ser. No. 60/823,633, filed on Aug. 25, 2006, which is incorporated by reference in its entirety. This application also claims priority to, and the benefit of, U.S. Provisional Patent Applications entitled, "Small Variations MIMO Precoders SVMP for Downstream FEXT Mitigation," having Ser. No. 60/854,742, filed Oct. 27, 2006, which is incorporated by reference in its entirety. This application also claims priority to, and the benefit of, U.S. Provisional Patent Applications entitled, "Off Diagonal MIMO Precoder ODMP for Cooperative Self Fext Cancellation," having Ser. No. 60/902,764, filed on Feb. 22, 2007, which is incorporated by reference in its entirety. This application also claims priority to, and the benefit of, U.S. Provisional Patent Applications entitled, "Adaptive Off-Diagonal MIMO Pre-Coder (ODMP) for Downstream DSL Self FEXT Cancellation," having Ser. No. 60/894,847, filed Mar. 14, 2007, which is incorporated by reference in its entirety.

TECHNICAL FIELD

The present disclosure generally relates to communications systems and more particularly, relates to multiple input multiple output (MIMO) precoding in an xDSL system.

BACKGROUND

Industries related to modern communication systems have experienced a tremendous growth due to the increasing popularity of the Internet. Digital subscriber line (xDSL) technology is a technology that has developed in recent years in response to the demand for high-speed Internet access. xDSL technology utilizes the communication medium of pre-existing telephone systems. Thus, both plain old telephone systems (POTS) and xDSL systems share a common line for xDSL-compatible customer premises. Similarly, other services such as time compression multiplexing (TCM) integrated services digital network (ISDN) can also share a common line with xDSL and POTS.

POTS services and xDSL services are deployed on non-overlapping frequency bands available on the communication medium. While there is generally little concern of cross-talk or other interference between POTS services and xDSL services, xDSL and TCM-ISDN often share a portion of the available bandwidth, thereby making xDSL services susceptible to cross-talk from TCM-ISDN services, and vice versa.

In the telecommunication art, the term "crosstalk" refers to interference that enters a message channel from one or more other channels through a path coupling the message channel with the interfering channels. Crosstalk can create annoyance in a voice system or errors in a data system. The degree in which crosstalk impacts the communication line will depend in part on such factors as the listener's hearing acuity, extraneous noise on the communication line, the frequency response of the coupling path, and the level of the disturbing signal.

There are generally two types of crosstalk mechanisms that are characterized, one being far end crosstalk (FEXT) and the other one being near-end crosstalk (NEXT). FEXT refers to electromagnetic coupling that occurs when the receiver on a disturbed pair is located at the far end of the communication line as the transmitter of a disturbing pair. Self-FEXT generally refers to FEXT generated from use of the same time slot or frequency.

In contrast, NEXT results from a disturbing source connected at one end of the wire pair which causes interference in the message channel at the same end as the disturbing source.

Allocations of wire pairs within telephone cables in accordance with service requests have typically resulted in a random distribution of pair utilization with few precise records of actual configurations. Because of the physical proximity of bundled cables (due to pair twisting, cable branching, cable splicing, etc.), crosstalk caused by the electromagnetic interference between the neighboring lines is often the dominating noise source in the transmission environment. In addition, due to pair twisting in cables where cable branching and splicing take place, a wire pair can be in close proximity to many different pairs spanning different portions of its length. At a telephone CO (central office), pairs in close proximity may carry diverse types of service using various modulation schemes, with considerable differences in signal levels (and receiver sensitivities) especially for pairs of considerably different lengths.

Both FEXT and self-FEXT (as well as NEXT) continue to be a problem in xDSL communication systems as crosstalk impacts overall performance. Current approaches to addressing crosstalk suffer from various perceived shortcomings such as increased design costs and inefficient use of computing resources. Therefore, a heretofore unaddressed need exists in the industry to address the aforementioned deficiencies and inadequacies.

SUMMARY

Briefly described, one embodiment includes a method for precoding data for transmission in a discrete multi-tone (DMT) xDSL system to cancel self-induced far end crosstalk (self-FEXT) comprising: learning characteristics associated with a plurality of N users within the xDSL system to determine an initial off-diagonal multiple input multiple output (MIMO) precoder (ODMP) for a given tone frequency; and converging towards an optimum ODMP from the initial ODMP in order to cancel downstream self-FEXT for the plurality of N users, wherein the ODMP is represented as a zero diagonal matrix with only off-diagonal terms, and wherein the converging towards the optimum ODMP comprises: maximizing the distributed channel capacity for the plurality of N users for the given tone frequency; and minimizing an increase in transmit power of the xDSL system relative to an original transmit power where a precoder is not active.

Another embodiment includes an optimum off-diagonal multiple input multiple output (MIMO) precoder (ODMP) for generating precoded signals to increase system performance for a plurality of users in an xDSL system comprising: an initialization module configured to learn characteristics of channels located within the xDSL system associated with the plurality of users to derive an initial ODMP; and a tracking module configured to converge towards an optimum ODMP from the initial ODMP to reduce downstream self-induced far end crosstalk (self-FEXT) by executing a least means square (LMS) adaptive algorithm, wherein the ODMP is represented as a zero diagonal matrix with only off-diagonal terms, wherein the tracking module maximizes the distributed channel capacity for the plurality of users, and wherein the tracking module minimizes increase in transmit power of the xDSL system.

Yet another embodiment includes an off-diagonal MIMO precoder (ODMP) in an xDSL system for pre-compensating for downstream self-induced crosstalk (self-FEXT) comprising: a learning module configured to learn CPE channel characteristics to obtain an initial ODMP; a tracking module configured to update the initial ODMP during showtime to obtain an optimum ODMP by receiving error data over a low speed feedback channel and executing a least means square (LMS) adaptive algorithm, the tracking module further configured to maximize channel capacity for the CPE, the tracking module further configured to minimize increase in transmit power of the xDSL system; and an incrementing module configured to perform one of: add new CPE to the xDSL system and remove existing CPE from the xDSL system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

By way of background, there are various standards for ADSL systems that are set forth by the International Telecommunications Union, Telecommunication Standardization Section (ITU-T). One ADSL standard is described in ITU-T Recommendation G.992.1—"Asymmetric Digital Subscriber Line (ADSL) Transceivers", which is herein incorporated by reference in its entirety. Prior to any transmission of actual data between the central office (CO) and the customer premises equipment (CPE), the two entities must first undergo an initialization procedure designed to familiarize the two entities with each other, identify the bandwidth capabilities for the current session, and further facilitate the establishment of a valid connection. Pursuant to ADSL standards provided by the International Telecommunication Union-Telecommunication Standardization Sector (ITU-T), these initialization procedures comprise the following: 1) a handshake procedure; 2) a transceiver training session; 3) a channel analysis session; 4) an exchange session; and finally 5) an actual data transmission session commonly referred to as "showtime."

The present invention relates to DMT based xDSL systems, such as ADSL systems, very high bit rate xDSL (VDSL) and VDSL2 systems, for example. Various embodiments of the present invention seek to mitigate the effects of both FEXT and self-FEXT in xDSL systems between customer premises equipment (CPE), such as xDSL modems, and a CO, which may include, for example, xDSL Access Multiplexer (DSLAM), xDSL line cards, and other equipment. For purposes of nomenclature used herein, the terms "far end users," "users," and "CPE" may be used interchangeably. Furthermore, as generally known by those skilled in the art, the term Shannon channel capacity refers to the maximum amount of information that can be reliably transmitted over a given channel. Precoding is one technique used to mitigate the effects of crosstalk in an xDSL system. Essentially, interference caused by crosstalk is pre-compensated for (or canceled out) at the CO before transmission of data.

Embodiments of off-diagonal multiple input/multiple output precoders (ODMP) are described herein which reduce self-FEXT effects from adjacent channels in an xDSL system while ultimately increasing the Shannon channel capacity. Furthermore, embodiments of ODMP described herein reduce the effects of FEXT without consuming an excessive amount of system resources. The various embodiments of ODMP described herein achieve cooperative self-FEXT cancellation through various phases: (a) learning the xDSL MIMO channel and/or the MIMO precoder; (b) tracking small variations of the channel and/or precoder (for a fixed number of users); and (c) "incrementing" the ODMP to add new users (or remove existing users) within the system. It should be appreciated that these steps are accomplished while meeting the following important requirements: 1) the overall objective of canceling or minimizing the effects of self-FEXT; 2) minimal impact on the overall transmit power of the system; 3) use of linear-adaptive processing without the need for computationally intensive matrix inversion operations; 4) minimization of the back channel bandwidth used for conveying error data; and 5) the need for fast convergence toward the optimum ODMP while maintaining robustness with respect to finite precision.

Figure 1A:
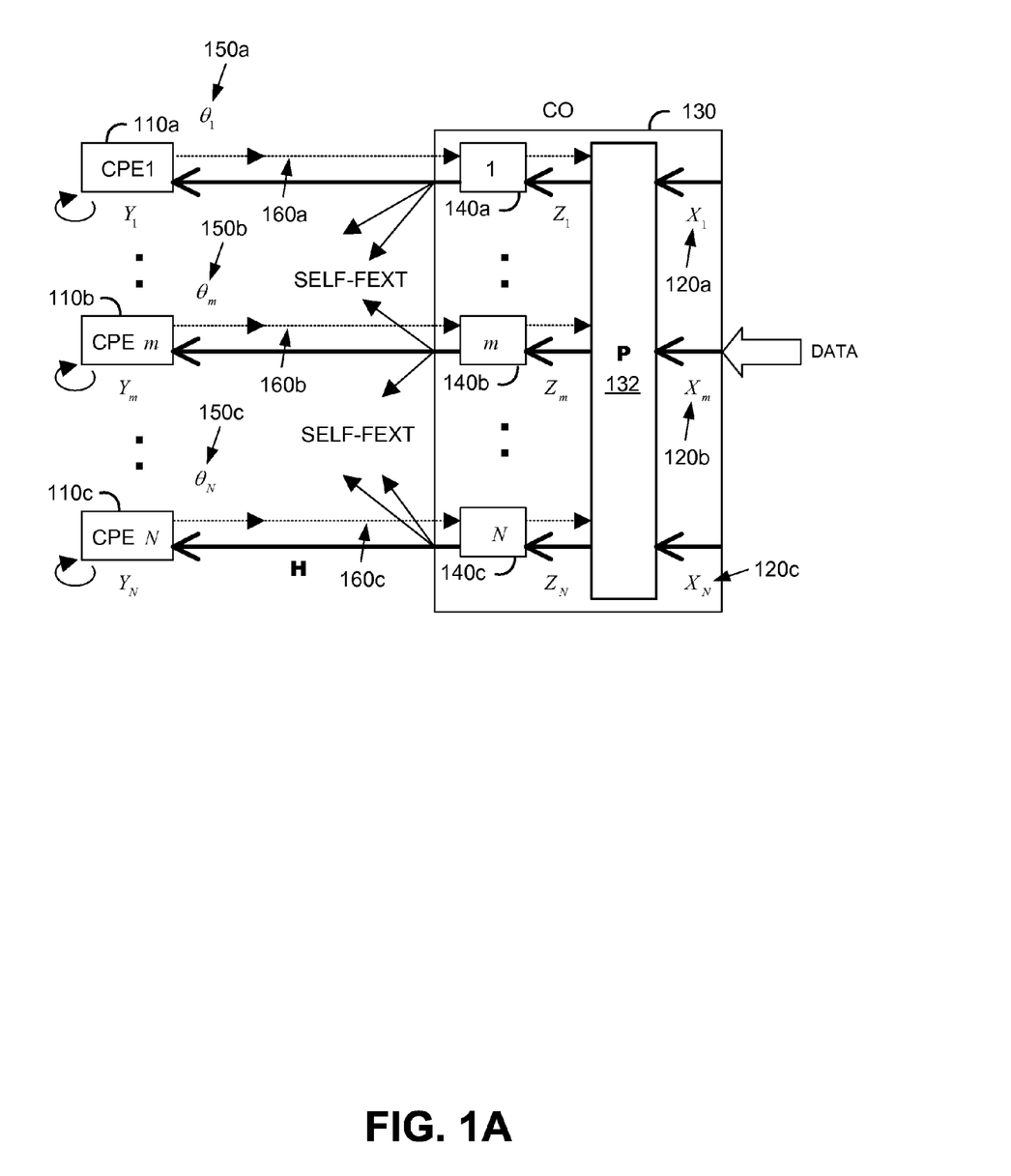
FIG. 1A illustrates an xDSL system in which embodiments of ODMP are applied.

Reference is now made to FIG. 1A, which illustrates an xDSL system in which embodiments of ODMP are applied. As shown in FIG. 1A, the MIMO xDSL channel is denoted by the [N, N] matrix: H[q,t] at DMT-symbol time instant t and discrete frequency q. For the non-limiting DMT based xDSL system depicted in FIG. 1A, there are N separate users (or N sets of CPE 110a, 110b, 110c). The expression X[q,t] denotes the complex vector collecting the N QAM downstream transmitted raw symbols, prior to pre-coding. Each of the QAM raw symbols is expressed as $X_m[q,t]$, $1 \leq m \leq N$ at DMT symbol time instant t and discrete frequency q, for transmitter m, 120a, 120b, 120c. Finally, embodiments of MIMO linear precoders described herein (i.e., ODMP) are expressed by the [N, N] matrix operator P[q,t] An ODMP module 132, which incorporates the operator is generally implemented within the CO 130.

As described above, generally, the CO may include an xDSL Access Multiplexer (DSLAM), ADSL line cards 140a, 140b, 140c, and other equipment for interfacing with CPE 110a, 110b, 110c. The DMT based xDSL system shown in FIG. 1A further includes a low speed back channel 160a, 160b, 160c used by each of the users (i.e., N sets of CPE 110a, 110b, 110c) to send feedback data upstream back to the CO 130. The feedback data sent from each user is used to derive an optimum ODMP P[q,t] and is denoted by the function $\theta_m[q,t]$, $1 \leq m \leq N$.

One perceived shortcoming associated with existing approaches is the need to either perform matrix inversion operations on multiple matrices or the need to incorporate multiple linear systems, both of which are computationally intensive, regardless of whether processing is performed at the CPE side or the CO side. Furthermore, another perceived shortcoming is the lack of an efficient means for "incrementing" precoders in order to add new users to the system. Embodiments described herein address these perceived shortcomings by incorporating linear adaptive processing without the need for computationally intensive matrix inversion operations. Embodiments described herein also provide a messaging protocol that allows error data to be conveyed from the customer premises equipment (CPE) to the CO over a low speed back channel. The messaging protocol is utilized to estimate and update the MIMO precoders at the CO.

Because the CPE individually perform demodulation of received signals, the diagonal terms within the MIMO xDSL channel matrix are separately and independently compensated, on a per tone basis, by a one tap frequency domain equalizer FEQ performed on every CPE. Embodiments of the ODMP module 132 perform learning, tracking and incrementing (of new users) to derive precoders that minimize the effects of self-FEXT. Exemplary embodiments of ODMP modules 132 further incorporate a reduced cost (least mean square) LMS-based algorithm that converges towards an optimum ODMP function for maximizing the distributed Shannon capacity of all the far end users (CPE).

The adaptive algorithm described herein utilizes error samples sent from the end users. As described herein, under correct detection and perfect diagonal equalization assumptions, concurrently minimizing the end user error variances results in maximization of Shannon capacities for each user. It should be noted that these assumptions are typically viable for xDSL systems since xDSL systems generally operate at a bit error rate of $10^{-7}$ or better and use learning sequences that are thousands of symbols in length. Furthermore, exemplary embodiments of ODMP utilize 16-bit precision for the encoding of complex valued error data. It should be appreciated that such precision allows the adaptive scheme to converge to a steady state solution in as little as 150 to 200 iterations while achieving close to FEXT-free performance of 0.2 dB or less.

Finally, for embodiments described herein, in CO-based implementations of cooperative FEXT cancellation, error data is passed from the CPE back to the CO for subsequent processing. A low speed back channel 160a-c is utilized by the CPE 110a, 110b, 110c to send error data back to the CO 130. For embodiments described herein for ODMP, a back channel with bandwidth on the order of only 128 kbps is sufficient to perform the learning phase (associated with ODMP) for 1,000 tones on the order of a few seconds while the xDSL connection remains active. This enables updating of 1,000 ODMP every 125 ms.

Figure 1B:
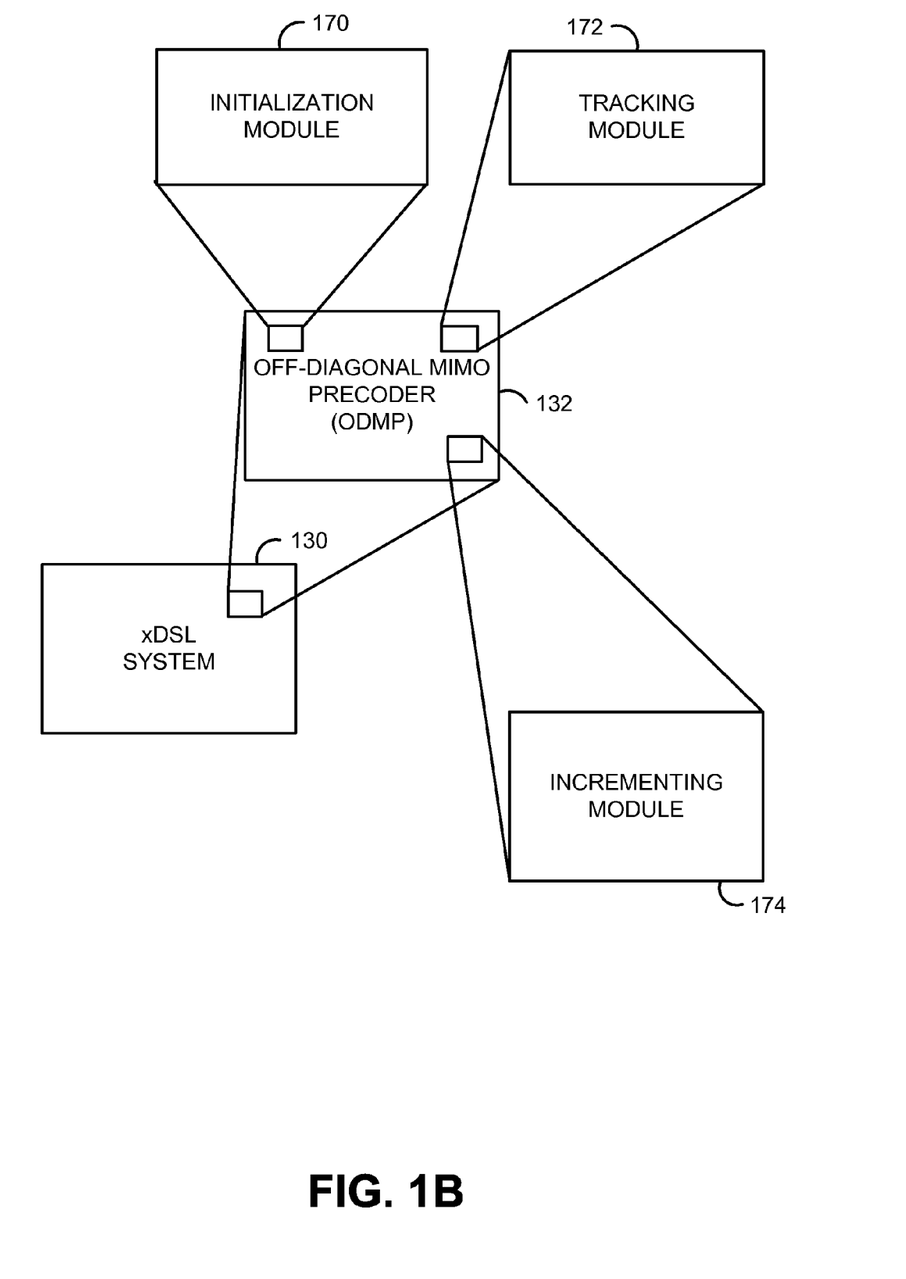
FIG. 1B illustrates various components of an alternative embodiment of the ODMP shown in FIG. 1A.

Reference is now made to FIG. 1B, which illustrates various components of an alternative embodiment of the ODMP module 132 shown in FIG. 1A. For some embodiments, the ODMP module 132 located within the xDSL system 130 in FIG. 1A and may be comprised of an initialization module 170, a tracking module 172, and an incrementing module 174.

The initialization module 170 is configured to learn characteristics of channels located between the CO and the plurality of users 110a-c within the xDSL system to derive an initial ODMP. The tracking module 172 is configured to iteratively converge towards an optimum ODMP function from the initial ODMP function to reduce downstream self-FEXT by executing a least means square (LMS) adaptive algorithm. In exemplary embodiments, the ODMP function may be represented as a zero diagonal matrix with only off-diagonal terms. Furthermore, the tracking module maximizes the distributed channel capacity for the plurality of users while keeping the transmit power of the xDSL system 130 almost constant. The incrementing module 174 is utilized to add a new user to the xDSL system during "showtime." In other embodiments, the incrementing module 174 is utilized to remove existing users from the system 130.

Figure 2:
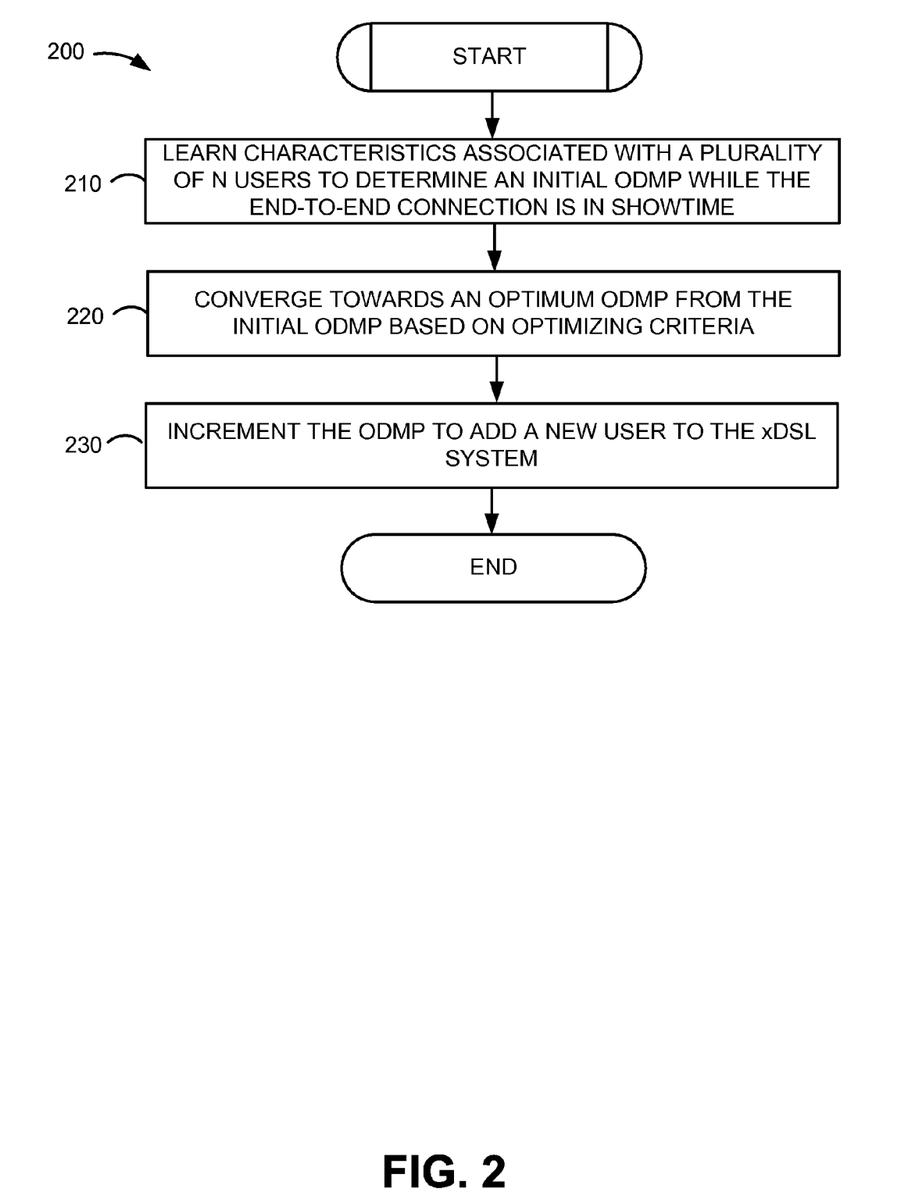
FIG. 2 depicts a top-level diagram for an embodiment of a method for deriving an optimum ODMP as described for FIG. 1A.

Reference is now made to FIG. 2, which depicts a top-level diagram for an embodiment of a method for deriving an optimum ODMP for downstream FEXT mitigation. Block 210 begins with the learning phase, where characteristics associated with a plurality of N users within the xDSL system are "learned" to determine an initial off-diagonal multiple input multiple output (MIMO) precoder (ODMP) for a given tone frequency, while the end-to-end connection is already in showtime. Next in block 220, the tracking or converging phase takes place where an optimum ODMP is derived from the initial ODMP based on optimizing criteria in order to cancel downstream self-FEXT for the plurality of N users, wherein the ODMP is represented as a zero diagonal matrix with only off-diagonal terms. For exemplary embodiments, the optimizing criteria comprises maximizing the channel capacity for all the users for the given tone frequency such that maximizing the channel capacity minimizes the self-FEXT of all the users and minimizing the increase in transmit power of the xDSL system to implement the ODMP. Finally, in block 230, the incrementing phase is performed in the event that a new user is added to the system. Alternatively, embodiments of the ODMP described herein may also adaptively remove existing users from the system.

A low complexity and adaptive ODMP that maximizes the distributed Shannon channel capacity per tone of all far end users is now described in detail. The ODMP structure combined with the "diagonal dominance" of the MIMO xDSL channels described herein lead to an optimum ODMP that maximizes the Shannon channel capacity while having negligible impact on the transmit power. One should also note that for exemplary embodiments of the ODMP, the adaptive scheme does not require any matrix inversion operations, which are computationally intensive in nature.

For purposes of nomenclature used herein, the following notations shall be understood as follows: G[q,t] and G[q,t] respectively denote an N-sized column vector and a [N, N] matrix, both referring to a tone (denoted by q) at DMT time symbol (denoted by t). Furthermore, the symbol $\|\cdot\|_F$ denotes the Frobenius norm of a matrix such that $\|G\|_F \triangleq \sqrt{TR[G^H G]}$. Reference is briefly made back to FIG. 1A, which illustrates various expressions used to derive an expression for MIMO precoding for cooperative downstream xDSL self FEXT cancellation for one particular discrete frequency tone q, q∈ $\{q_1, \ldots, q_Q\}$ at a particular DMT symbol time instant t. FIG. 1A illustrates one particular tone for one particular DMT time symbol.

Embodiments of ODMP cancel the effects of self-FEXT by performing the following. Before transmission through a MIMO xDSL downstream channel H[q,t] (shown in FIG. 1A) the complex vector X[q,t] configured to collect N QAM raw symbols (again, denoted by the expression $X_m[q,t]$, $1 \leq m \leq N$ in FIG. 1A) transmitted by N downstream xDSL transceivers undergoes MIMO linear precoding, represented as P[q,t]. The signals received by the far end users may therefore be expressed by the following equation:

$$Y[q,t] = (HPX)[q,t] + V[q,t] \qquad \text{Equation 1}$$

In the equation above, Y[q,t] represents the signals received by the users. Furthermore, V[q,t] denotes the vector, which reflects both external (i.e., alien) crosstalk and background noise. As known by those skilled in the art, the vector V[q,t] is normal and circularly distributed. Furthermore, V[q,t] is a zero mean vector, and although it may be spatially correlated (in the presence of external crosstalk), very short xDSL crosstalk time coherence along with stationary assumptions lead to essentially zero correlation across different tones and across different DMT time symbols. As briefly discussed above, it should be noted that although the precoder is a MIMO operator, the end-to-end system cannot be treated on a system level as a full MIMO system because the users (i.e., N sets of CPE as shown in FIG. 1A) independently perform demodulation of received signals $Y_m[q,t]$, $1 \leq q \leq N$. That is, the far end users do not operate in a cooperative fashion. Rather demodulation of received signals is performed on a user-by-user basis in an independent fashion. Thus, for exemplary embodiments of ODMP, each far end user transmits feedback information (again, denoted by the function $\theta_m[q,t]$, $1 \leq m \leq N$) to the CO via a low speed channel with a bandwidth on the order of a few hundreds kbps. The CO then processes this feedback data to perform learning, tracking, and incrementing functions to derive an optimum precoder. It should be noted that while some embodiments involve CO-centric processing, other embodiments may involve CPE-centric processing where processing of error data is performed locally at the CPE rather than being sent upstream.

The MIMO channel matrix of the MIMO xDSL downstream channel H[q,t] may be further expressed by the following equation:

$$H = ((H)_d(I+C)) \qquad \text{Equation 2}$$

C denotes a zero diagonal matrix that represents self-FEXT channels. Thus, by definition, the zero diagonal matrix C has zero diagonal entries and the following holds true: $C = (C)_{nd}$ where $(\ )_{nd}$ denotes the operator that zeroes out the diagonal entries and where the off diagonal terms remain unchanged. One should note that the linear precoders described herein reflect off-diagonal components. The ODMP defined by the following equation reflects this characteristic: $P = (I-R)$. This equation represents the family of linear precoders which define the off-diagonal typo of MIMO precoder since by definition, the matrix R also has zero diagonal entries and the following holds true: $R = (R)_{nd}$.

As noted above, embodiments of the present invention seek to meet various performance constraints, including the requirement of deriving an ODMP that has minimal impact on the overall transmit power of the xDSL system. With the transmit power denoted as γ, further calculations lead to the following expression, which reflects the relative change in the average transmit power from the N co-located xDSL transceivers with ODMP implemented:

$$\frac{\delta\gamma}{\gamma} \triangleq \frac{\gamma(R=0) - \gamma(R)}{\gamma(R=0)} = -\frac{\|R\|_F^2}{N} \qquad \text{Equation 3}$$

The operator $\|\ \|_F$ again designates the Frobenius norm of a matrix. The equation above leverages the fact that, by definition TR[R]=O. Thus, the relative change in average transmit power $|\delta\gamma/\gamma|$ with an ODMP implemented will generally be on the order of less than $10^{-2}$, provided that the off diagonal matrix R maximizes the Shannon capacity of all the far end users. Those with ordinary skill in the art will appreciate that such a value ($<10^{-2}$) is considered negligible in xDSL systems. It should be further noted that therefore, no additional transmit power constraints must be incorporated into the diagonal matrix R provided that the distributed Shannon capacity for all the end users is maximized. It should also be noted that all the co-located xDSL transmitters emit the same downstream power, denoted by $E[|X_m|^2] = \sigma_X^2$, $1 \leq m \leq N$ which leads to the relationship, $\gamma(R=O) = \sigma_X^2$.

Thus, the "precoded" MIMO-DSL channel (denoted by $\tilde{H}$) with ODMP implemented can be expressed by the following equation:

$$\tilde{H} \triangleq HP = [(H)_d(I-(CR)_d)] + [(H)_d(C-R-(CR)_{nd})] \qquad \text{Equation 4}$$

The equation above illustrates that the equivalent MIMO channel is sub-divided into two sub-MIMO channels. The first sub-MIMO channel is a "FEXT-free" diagonal matrix. The second sub-MIMO channel is off diagonal in nature and reflects self-induced FEXT.

Various embodiments described herein seek to maximize the downstream distributed Shannon channel capacity by mitigating the effects of FEXT. The Shannon downstream channel capacity may be expressed by the parameter $\tilde{\Omega}_m$. The downstream capacity experienced by the far end user m, $1 \leq m \leq N$, in the presence of an ODMP is given by the following equation:

$$\tilde{\Omega}_m = \log_2\left(1 + \frac{|H_{m,m}|^2 |1 - (CR)_{m,m}|^2 \sigma_X^2}{|H_{m,m}|^2 \left\| \begin{array}{c} C_m^T - R_m^T - \\ \text{row}_m\{(CR)_{nd}\} \end{array} \right\|^2 \sigma_X^2 + \sigma_{Vm}^2}\right), \qquad \text{Equation 5}$$

$$1 \leq m \leq N$$

wherein the term $C_m^T$ (respectively $R_m^T$) denotes the row m, $1 \leq m \leq N$ of matrix C (respectively matrix R) and the term a $\sigma_{Vm}^2$ designates the power from external and background noises experienced by receiver m. As discussed earlier, since the far end users do not perform joint demodulation of received signals, the full MIMO Shannon capacity cannot be used as an optimization criterion for mitigating the effects of self-induced FEXT since the end users to not cooperatively demodulate the received signals. Rather, exemplary embodiments of ODMP mitigate self-induced FEXT by independently maximizing the channel capacity of each of the individual downstream channels.

An ODMP scheme that maximizes the channel capacity of all the far end users (and that ultimately minimizes the effects of self-FEXT) is proven to be defined by the following relationship:

$$R° = C - (CR°)_{nd} \qquad \text{Equation 6}$$

The matrix R denotes the concatenation of N row vectors $R_m^T$, $1 \leq m \leq N$. Each of the N row vectors $R_m^T$, $1 \leq m \leq N$ precodes the N−1 sources that cause FEXT to be induced into receiver m. Since the end users do not cooperate (i.e., do not perform joint modulation of received signals), a search is performed through the row vectors $R_m^T$, $1 \leq m \leq N$ to find the source that maximizes the capacities $\tilde{\Omega}_m$, $1 \leq m \leq N$ of all end users. Next, the optimum vectors concurrently zero the complex gradient of the capacities as reflected by the following operation:

$$\nabla_{R_m}\tilde{\Omega}_m=0, 1\leq m\leq N \quad \text{Equation 7}$$

Next, the complex gradient is applied to the Shannon capacity $\tilde{\Omega}_m$. One should note that the row vector $\text{row}_m\{(CR)_{nd}\}$ and the complex scalar $(CR)_{m,m}$ do not depend upon the components of $R_m$ because of the off diagonal feature of both matrices C and R. The N relationships for the optimum vectors are derived as:

$$R_m^{oT}=C_m^T-\text{row}_m\{(CR^o)_{nd}\}, 1\leq m\leq N \quad \text{Equation 8}$$

Next, applying this equation into the Shannon capacity expression results in cancellation of the self-induced FEXT components, thereby eliminating FEXT for the given capacity (denoted by $\tilde{\Omega}_m^o$) of a precoded channel. Thus, the maximum capacity wherein the effects of FEXT is eliminated is represented by the following expression:

$$\tilde{\Omega}_m^o \triangleq \log_2\left(1+\frac{|H_{m,m}|^2|1-(CR^o)_{m,m}|^2\sigma_X^2}{\sigma_{V_m}^2}\right), \quad \text{Equation 9}$$

$$1\leq m \leq N$$

Furthermore, if the Optimum ODMP R°, solution of equation 6 is replaced by its "first order approximation" equal to the matrix C for purposes of simplicity, then a performance loss is incurred. The associated change in SNR denoted by $\text{SNR}_{loss,dB}^{(1)}$ is represented by the following:

$$\tilde{SNR}_{m,dB}^{(1)loss} = 10\log_{10}\left(1+SNR_m\|\text{row}_m\{(C)_{nd}^2\}\|^2\right) \quad \text{Equation 10}$$

The loss in SNR may thus be represented by the following:

$$\tilde{SNR}_{m,dB}^{(1)loss} \leq 10\log_{10}\left(1+SNR_m\frac{\rho^4}{N}\right) \quad \text{Equation 11}$$

In equation 11, ρ designates an upper bound of the Frobenius norm of the matrix C. The parameter ρ is generally significantly smaller than unity for a wide range of frequencies within the deployment reach of VDSL systems. It should be noted that the relative change in transmit power is negligible, as discussed earlier. The average transmit power with precoding implemented is expressed as:

$$\left|\frac{\delta\gamma^{(1)}}{\gamma}\right|\leq \frac{\rho^2}{N} \quad \text{Equation 12}$$

As a non-limiting example, consider an xDSL system with a 25 pair binder operating at 3 MHz at 1,000 feet of coupling distance. A typical value for the parameter ρ 99% of the time is approximately $2\times10^{-1}$ for these operating parameters. Applying the equation above reveals that the relative transmit power change as a result of implementing various embodiments of ODMP is indeed less than $10^{-2}$ in 99% of deployment scenarios. As such, embodiments of ODMP meet the objective of minimizing the impact to the overall transmit power of the system with ODMP incorporated.

It should be appreciated that for various embodiments of the ODMP described herein, ODMP not only maximizes the capacities of each of the channels but also minimizes the variances in error associated with each of the individual channels at the far end. This generally holds true given the very low bit error bit (BER) in which xDSL modems operate and the high level of stability typical in xDSL lines. As described earlier, it should further be noted that various embodiments may provide for a CPE-CO shared processing scheme where computations are performed in a distributed manner. As a non-limiting example, error data may be processed at each of the individual CPE to generate ODMP parameters, which may then be passed upstream to the CO to perform precoding. For some embodiments, the CPE may transmit data to the CO over a low bandwidth channel.

As part of the ODMP scheme, an adaptive algorithm is performed based on error data passed from the CPE. Executing the adaptive algorithm allows estimating, tracking, and incrementing to be performed in order to derive an optimum ODMP for a given xDSL system. As part of the adaptive algorithm, an initialization process is first performed. The adaptive algorithm is initialized with a maximum likelihood (ML) estimate of the first order ODMP expressed as $R^{(1)}\triangleq C$. The adaptive scheme follows a classical least mean square (LMS) stochastic gradient approach. Initialization is performed in normal data mode but without precoding enabled. This absence of precoding in the initialization phase is reflected by $R\triangleq O$. A ML estimate of a first order ODMP vector can then be derived as follows:

$$\hat{C}_{-m}^{ML}[T] = -\frac{1}{\sigma_X^2}\frac{1}{T}\sum_{k=1}^{T}X_m^*[t_k]E_m[t_k] \quad \text{Equation 13}$$

In equation 13, $X_{-m}$ denotes a vector of size N−1 that collects the N−1 downstream QAM symbols transmitted from the N−1 channels that cause self-FEXT in channel m. This reflects the initial ODMP resulting from the learning phase. One should note that this initial ODMP reflects a mere cross correlation between the error samples and the transmit QAM symbols.

Next, the adaptive algorithm operates in data mode but this time with precoding (ODMP) enabled. The transient phase of the adaptive scheme completes the learning phase while the scheme can later be leveraged to track and increment an optimum ODMP. While the adaptive processing is performed, the error data is expressed as:

$$E_m[t/t'] = \frac{\left(\begin{array}{c}R_{-m}^T[t']-C_{-m}^T+\\ \text{row}_{-m}\{(CR)_{nd}[t']\}\end{array}\right)X_{-m}[t]+W_m[t]}{(1-(CR)_{m,m}[t'])}, \quad \text{Equation 14}$$

$$1\leq m\leq N$$

In the equation above, t represents the current time instant and t' represents the previous updating time instant. The derivation of the adaptive scheme is based on the calculation of the gradient of the square modulus of the error $E_m[t/t']$ given in the equation above, with respect to $R_{-m}$ for all the receivers, $m\in\{1,\ldots,N\}$. This methodology is based on classical instantaneous stochastic gradient approaches. It should be noted that with the error equation above, the fact that both the row vector $(\text{row}_m\{(CR)_{nd}\})$ and the complex scalar $(CR)_{m,m}$ do not depend on the components of $R_m$ (due to the off-diagonal structure of the two matrices C and R) means that calculations are greatly simplified. Indeed, the equation above does not require any matrix inversion and is proportional to the instantaneous correlation between the error and the vector of FEXT disturbers expressed as:

$$\nabla R_{-m}(|E_m[t/t']|^2) \propto X^*_{-m}[t]E_m[t/t'], \quad 1 \leq m \leq N \quad \text{Equation 15}$$

The equation above leads to the following concurrent recursive updates of the vectors $\hat{R}_{-m}$ for all the receivers, $1 \leq m \leq N$:

$$\hat{R}_{-m}[t_{n+1}] = \hat{R}_{-m}[t_n] - \mu[t_{n+1}]X^*_{-m}[t_{n+1}]E_m[t_{n+1}/t_n],$$
$$n \geq 0, 1 \leq m \leq N \quad \text{Equation 16}$$

As described above, the adaptive algorithm performs initialization based on ML estimates of the first order ODMP expressed as:

$$\hat{R}_{-m}[t_0] = \hat{C}_{-m}^{ML}[T] = \hat{R}_{-m}^{(1)}[t_0], \quad 1 \leq m \leq N \quad \text{Equation 17}$$

Finally, the N concurrent LMS algorithms described by the equations above converge toward an optimum ODMP solution which provides the maximum capacity for a precoded channel while eliminating FEXT. Furthermore, it should be appreciated that the adaptive algorithm described above exhibits linear complexity in the sense that it requires only $2 \times (N-1)$ complex multiplication operations for each receiver m, $1 \leq m \leq N$.

It should also be appreciated that embodiments of ODMP provide for non-disruptive incrementing of ODMP such that new users may be added. Generally, it will appreciated by those skilled in the art that the addition of new channels within an xDSL system is more challenging than removing existing channels. During the tracking phase, the size of the MIMO precoder does not change. That is, a fixed number of off diagonal components are updated in order to follow slow variations of the channel. When new users are added, however, the size of the MIMO-DSL channel grows. Furthermore, the number of self-FEXT precoders increases.

As a non-limiting illustration, the following describes the process by which a single user is added to the system. It should be noted that the same scheme may be extended to add multiple new users. For some embodiments, the addition of new users is performed while operating in data mode whereby the existing N users benefit from a [N, N] dimensional ODMP $\hat{R}_N$. When a new user is to be added, the network management informs the cooperative self-FEXT device at the CO that a new user, denoted by the index N+1, is activated at time $t_{new}$. Thus, at this point in time, the ODMP is incremented to accommodate the new user. Between time $t_{new}$ and $t_{init}$, the incremented ODMP is initialized and then incremented based on ML estimation. Finally, at time $t_{init}$, the LMS is activated for tracking purposes. Thus, the incrementing process can be summarized as a two-step process—initialization and adaptation of the new user.

The following steps are performed after activation of the new user during time $t_{new} \leq t \leq t_{init}$. The [N+1, N+1] ODMP $\hat{R}_{N+1}$ is first initialized and reflects the new user designated as N+1. After initialization, the adaptive algorithm is performed to complete the estimation of $\hat{R}_{N+1}$ and in order to enter the tracking phase. During both the initialization and the completion of the learning phase of $\hat{R}_{N+1}$, the power of the new user N+1 may follow a ramping pattern that can be expressed by:

$$\sigma_{X,N+1}^2[t_{new}] \leq \sigma_{X,N+1}^2[t] \leq \sigma_{X,N+1}^2[t_{end}] t_{new} \leq t \leq t_{end} \quad \text{Equation 18}$$

It should be noted that the steady increase in the transmit power associated with new user N+1 minimizes the impact to the other existing users even though the learning and precoding of the new user has not been performed yet. At the end of the full learning phase at $t = t_{end}$, new user N+1 transmits the same power as the other CO-ports providing the same service, $\sigma_{X,N+1}^2[t_{end}] = \sigma_X^2$.

$\hat{R}_{N+1}$ is initialized with a ML estimate of its first order approximation (i.e., $$\hat{R}_{N+1}^{(1)} = C_{N+1}).$$

Straightforward "accumulation property" of matrix $C_{N+1}$ revealed in the equation below greatly facilitates the initialization, $$C_{N+1} = \begin{bmatrix} C_N & C_{N,N+1} \\ C_{N+1}^T & 0 \end{bmatrix} \quad \text{Equation 19}$$

Indeed, as displayed in the equation above, the sudden occurrence of a new user requires the estimation of only 2N new cross coupling coefficients, $C_{m,N+1}[q]$, $1 \leq m \leq N$ (components of vector $C_{N,N+1}$) and $C_{N+1,k}[q]$, $1 \leq k \leq N$ (components of vector $C_{N+1,N}^T$). The first set $C_{m,N+1}[q]$, $1 \leq m \leq N$ reflects the FEXT interference from the new user onto the existing users while the second set $C_{N+1,k}[q]$, $1 \leq k \leq N$ expresses the FEXT interference generated by the existing users onto the new user. Since precoding has not been performed yet for the new user N+1, the ongoing precoder $\hat{R}_N[t]$, $t \geq t_{new}$ of the N existing users does not change the actual cross FEXT channel stemming from user N+1 onto the existing users. Therefore, the ML estimation of the coefficients $C_{m,N+1}[q]$, $1 \leq m \leq N$ may be expressed as:

$$\hat{C}_{m,N+1}^{ML}[q] = -\frac{\sum_{n=1}^{T} E_m[q, t_{new} + \delta_n] X_{N+1}^* p[q, t_{new} + \delta_n]}{\sum_{n=1}^{T} |X_{N+1}|^2[q, t_{new} + \delta_n]}, \quad \text{Equation 20}$$

$$1 \leq m \leq N$$

In the equation above, the term $X_{N+1}[q, \delta_n + t_{new}]$ denotes the downstream transmit symbol from user N+1, for tone q and DMT time symbol $\delta_n + t_{new}$. Furthermore, the term $\delta_n$, $1 \leq n \leq T$ denotes that T DMT time symbols increment with respect to the activation time $t_{new}$ of new user N+1. The estimation of the coefficients $C_{N+1,k}[q]$, $1 \leq k \leq N$ requires the compensation of the precoder $\hat{R}_N[t_{new} + \delta]$, $\delta \geq 0$ such that:

$$\hat{C}_{N+1,N}^{T,ML}[q] = \left( -\frac{1}{T} \sum_{n=1}^{T} E_{N+1}[q, t_{new} + \delta_n] \tilde{X}_{-(N+1)}^H[q, t_{new} + \delta_n] \right) \quad \text{Equation 21}$$

$$\left( I - \hat{R}_N^{ref}[q] \right)^{-1}$$

In the equation above, the term $\tilde{X}_{-(N+1)}$ can be calculated as $\tilde{X}_{-(N+1)} = X_{-(N+1)}/\sigma_X^2$ and is the normalized vector of size N from which the contribution of user N+1 has been removed. Furthermore, the term $\hat{R}_N^{ref}$ reflects any kind of "reference" for the matrices $\hat{R}_N[t_{new} + \delta_n]$, $1 \leq n \leq T$. This reference can be the original value $\hat{R}_N[t_{new}]$, the final value $\hat{R}_N[t_{new} + \delta_T]$, an average, etc. Because of the small variations properties of the matrix $\hat{R}_N^{ref}$, the matrix inversion $(I - \hat{R}_N^{ref})^{-1}$ that shows up in Equation 50 above can be efficiently replaced by the following matrix: $\approx (I + \hat{R}_N^{ref})$. The initialization of $\hat{R}_{N+1}$ may be expressed as:

$$\hat{R}_{N+1}[t_0] = \begin{bmatrix} \hat{R}_N^{ref} & \hat{C}_{N,N+1}^{ML} \\ \hat{C}_{N+1,N}^{T,ML} & 0 \end{bmatrix}, t_0 \geq t_{new} + \delta_T \quad \text{Equation 22}$$

The subsequent updates to the row vectors of matrix $\hat{R}_{N+1}$ are derived from Equation 16 above and yields the following:

$$\hat{R}_{-m}[t_{n+1}] = \hat{R}_{-m}[t_n] - \mu[t_{n+1}] X^*_{-m}[t_{n+1}] E_m[t_{n+1}/t_n],$$
$$t_n \geq t_0 \geq t_{new} + \delta_T, 1 \leq m \leq N+1 \quad \text{Equation 23}$$

It should be noted that in the equation above, both vectors $R_{-m}$ and $X_{-m}$ now have a size equal to N. Finally, while the steps described above relate to the addition of a single new user, multiple users may be added as well.

Figure 3:
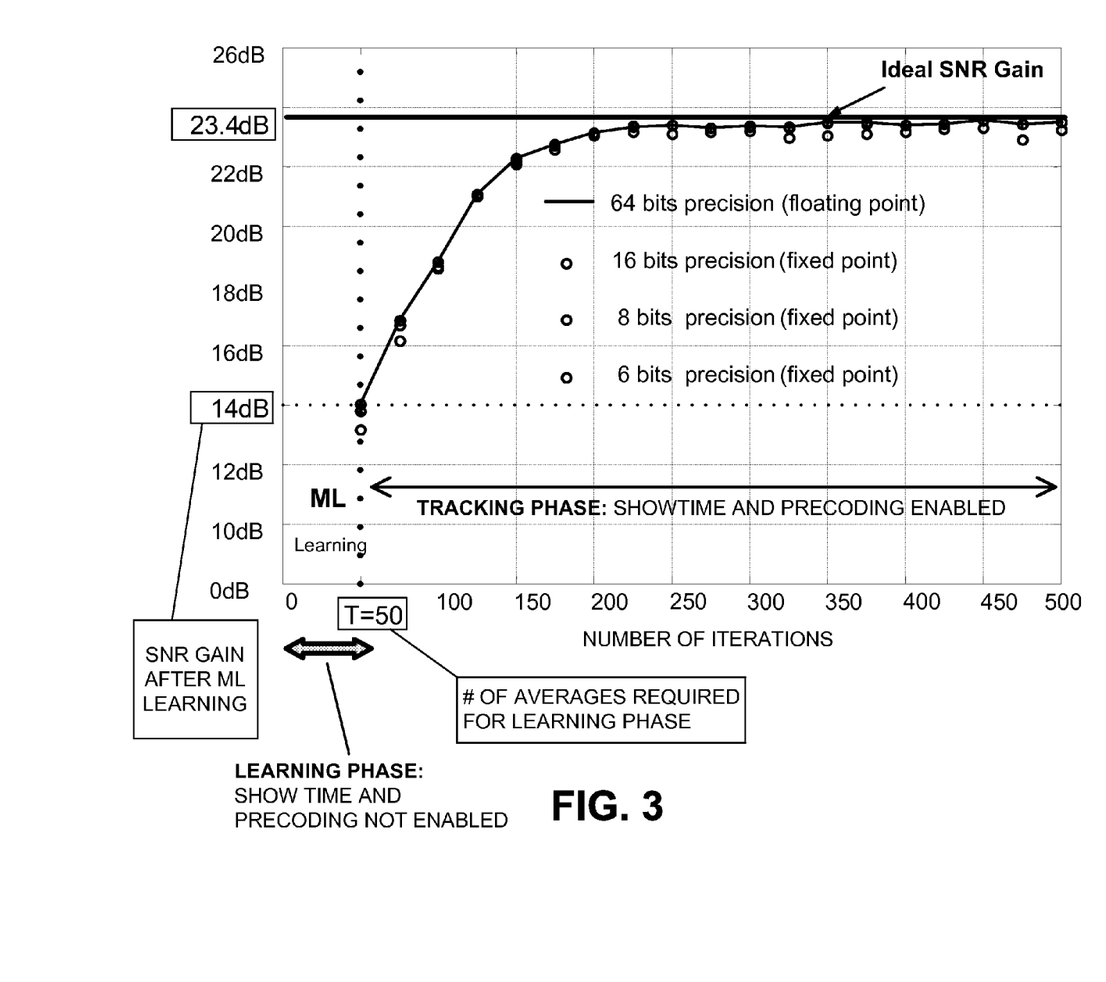
FIG. 3 illustrates how a low speed back channel may be used to incorporate an embodiment of the method shown in FIG. 2.

Reference is now made to FIG. 3, which illustrates how a low speed back channel may be used to incorporate an embodiment of the method shown in FIG. 2. Specifically, FIG. 3 provides simulation results reflecting the gain in downstream SNR for QAM tone # 696 (3 MHz) at a loop length of 1 kft over 26 AWG across varying levels of precision for the error feedback data. For the simulation results shown in FIG. 3, the transmit power spectral density (PSD) is flat at −60 dBm/Hz, reflecting band plan 998. The reference situation reflects data mode without precoding. The reference raw SNR of tone# 696 is equal to 43 dB. An ideal condition refers to a precoded channel that is FEXT-free. The ideal gain in SNR is derived from the difference (measured in dB) between the SNR under ideal conditions and the SNR obtained when no precoder is used (shown to be 43 dB in FIG. 3). The ideal SNR gain is equal to 23.4 dB.

FIG. 3 illustrates use of an ODMP I−$\hat{R}$ where $\hat{R}$ is based on Equations 16 and 17. The LMS algorithm is initialized with the ML value obtained (or converged upon) after T averages or iterations. This convergence scheme is denoted by ML(T)−LMS(K), where K stands for the number of iterations of the LMS updating scheme. The SNR gain in the practical situation may be evaluated assuming regular precision or a smaller number of bits b to code the real part and the imaginary parts of the error (i.e., (2×b) bits to code the complex error). For purposes of nomenclature, the practical SNR gain is denoted by PG−SNR(b, T, K).

FIG. 3 displays the following four practical SNR gains versus the number of LMS iterations K during the tracking phase, post learning phase for T=50 averages:

PG−SNR(b=6 bits, T=50, K)

PG−SNR(b=8 bits, T=50, K)

PG−SNR(b=16 bits, T=50, K)

PG−SNR(b=64 bits, T=50, K)

The learning phase is performed during "showtime" with no precoder active while the tracking phase is performed with the precoder active. The four SNR figures shown in FIG. 3 reflect four different precision levels for the error, namely b=6 bits, b=8 bits, b=16 bits (all in fixed point format) and b=64 bits. The ideal SNR gain of 23.4 dB is denoted by the horizontal line shown in FIG. 3.

Examination of FIG. 3 reveals that after performing the learning phase based on only 50 points, it is possible to achieve a gain in SNR of approximately 14 dB while utilizing error precision levels of 64 bits, 16 bits, and 8 bits. Furthermore, a gain in SNR of approximately 13.2 dB can be achieved while utilizing an error precision level of 6 bits. Thus, it should be noted that utilizing just 8 bits of precision for error feedback data yields the same SNR gain as when utilizing 16 bits and even 64 bits of error precision.

After the learning phase, the FEXT cancellation based on embodiments of the ODMP precoder is enabled, and the tracking phase begins using the LMS scheme initialized by the cross channel "learned" values. It should be further noted that as shown in FIG. 3, the LMS scheme utilized for embodiments of the ODMP described herein exhibits fast convergence for any precision level. As shown in FIG. 3, the LMS scheme converges towards steady state in approximately 200 iterations for all four error precision levels (6 bits, 8 bits, 16 bits and 64 bits). Furthermore, use of error precision levels of 8 bits, 16 bits and 64 bits allows the LMS scheme to converge to as close as 0.2 dB within FEXT-free performance (i.e., ideal conditions). Thus, for exemplary embodiments of the ODMP, only 3,200 bits of error data are required to achieve adaptive ODMP convergence. One skilled in the art will appreciated that 3,200 bits is just a fraction of the number of bits required for other conventional approaches.

Regarding the convergence time of the learning and tracking phases for CO-based processing, it is assumed that the back channel operates on a per DMT symbol basis where error samples are transmitted in increments of 250 μsec such that each error sample contains 16 bits (8 bits for each of the real and imaginary parts) and such that each DMT symbol can transport the error samples of 2 tones. Based on these assumptions, a total of only 6.25 ms is needed to perform 50 average samples under the ML learning phase for one tone (i.e., 6.25s for 1,000 tones). For the tracking phase, the convergence time needed to perform 200 LMS iterations for 1,000 tones is 25 seconds.

It should be noted that the learning phase is performed only once upon initialization of the system. Once the system enters the tracking phase, the system does not need to re-enter the learning phase, even if users are added or removed. Furthermore, it should be noted that the system remains in "show time" with precoding enabled.

It should be emphasized that the above-described embodiments are merely examples of possible implementations. Many variations and modifications may be made to the above-described embodiments without departing from the principles of the present disclosure. Furthermore, it should be emphasized that embodiments discussed herein may be implemented in (and/or associated with) one or more different devices. More specifically, depending on the particular configuration, the embodiments of the ODMP described herein may be implemented in any xDSL modem, CO equipment such as an xDSL Access Multiplexer (DSLAM), xDSL line cards, and other equipment. All such modifications and variations are intended to be included herein within the scope of this disclosure and protected by the following claims.

At least the following is claimed:

1. A method for precoding data for transmission in a discrete multi-tone (DMT) xDSL system to cancel self-induced far end crosstalk (self-FEXT) comprising:

learning, by an initialization module, characteristics associated with a plurality of N users within the xDSL system to determine an initial off-diagonal multiple input multiple output (MIMO) precoder (ODMP) for a given tone frequency; and converging, by a tracking module, towards an optimum ODMP from the initial ODMP in order to cancel downstream self-FEXT for the plurality of N users, wherein the ODMP is represented as a zero diagonal matrix with only off-diagonal terms, and wherein converging by the tracking module towards the optimum ODMP comprises:

maximizing the channel capacity for the plurality of N users for the given tone frequency; and minimizing an increase in transmit power of the xDSL system relative to an original transmit power where a precoder is not active.

2. The method of claim 1, wherein maximizing the channel capacity for all the users minimizes the variances in the error data associated with the plurality of users.

3. The method of claim 1, wherein learning is performed during showtime and with the ODMP not enabled.

4. The method of claim 1, wherein converging is performed during showtime and with the ODMP enabled.

5. The method of claim 1, wherein the initial ODMP is a cross correlation coefficient between data transmitted from the CO and error associated with the transmitted data for each user m, wherein the cross correlation coefficient is calculated such that FEXT from all users other than user m is considered, wherein $1 \leq m \leq N$.

6. The method of claim 1, wherein converging towards the optimum ODMP further comprises executing a least means square (LMS) adaptive algorithm while the ODMP is enabled, the LMS adaptive algorithm expressed by the following:

$$\hat{R}_{-m}[t_{n+1}] = \hat{R}_{-m}[t_n] - \mu[t_{n+1}]X^*_{-m}[t_{n+1}]E_m[t_{n+1}/t_n],$$
$$n \geq 0, 1 \leq m \leq N$$

wherein $E_m[t/t']$ represents an error function, m represents a channel, and $X_{-m}$ denotes a vector of size N−1 that collects N−1 downstream QAM symbols transmit from N−1 channels that cause self FEXT into channel m, wherein the LMS adaptive algorithm represents the optimum ODMP, and wherein only 2(N−1) complex multiplications are performed for each user.

7. The method of claim 6, wherein converging towards an optimum ODMP further comprises receiving error data at a central office (CO) from the users, wherein the error data is used by the CO to adaptively update the ODMP and converge towards the optimum ODMP at the CO, and wherein calculating the ODMP is performed without matrix inversion operations.

8. The method of claim 7, wherein the CO receives the error data from the users via a low speed back channel with a bandwidth of approximately 128 kbps.

9. The method of claim 7, wherein the error data is based on 16-bit precision.

10. The method of claim 6, wherein converging towards an optimum ODMP comprises processing the error data and performing the least means square (LMS) adaptive algorithm for each of the N users.

11. The method of claim 1, further comprising incrementing the ODMP to add a new user to the xDSL system.

12. The method of claim 11, wherein incrementing comprises:

estimating 2N new cross coupling coefficients comprising a first set and a second set, wherein the first set reflects FEXT from the new user into existing users, and wherein the second set reflects FEXT from the existing users into the new user, wherein estimating the 2N new cross coupling coefficients is performed according to the following expressions:

$$\hat{C}^{ML}_{m,N+1}[q] = -\frac{\sum_{n=1}^{T} E_m[q, t_{new} + \delta_n]X^*_{N+1}[q, t_{new} + \delta_n]}{\sum_{n=1}^{T} |X_{N+1}|^2[q, t_{new} + \delta_n]}, 1 \leq m \leq N$$

$$\hat{C}^{T,ML}_{N+1,N}[q] = \left(-\frac{1}{T}\sum_{n=1}^{T} E_{N+1}[q, t_{new} + \delta_n]\tilde{X}^H_{-(N+1)}[q, t_{new} + \delta_n]\right)\left(I - \hat{R}^{ref}_N[q]\right)^{-1};$$

and limiting impact into existing users, wherein power for a new user follows a steady increase profile optimized such that a change in SNR (signal-to-noise ratio) experienced by existing users is limited to a maximum value, wherein the maximum value is equal to a predetermined margin of the xDSL system.

13. An optimum off-diagonal multiple input multiple output (MIMO) precoder (ODMP) for generating precoded signals to increase system performance for a plurality of users in an xDSL system comprising:

an initialization module configured to learn characteristics of channels located within the xDSL system associated with the plurality of users to derive an initial ODMP; and a tracking module configured to converge towards an optimum ODMP from the initial ODMP to reduce downstream self-induced far end crosstalk (self-FEXT) by executing a least means square (LMS) adaptive algorithm, wherein the ODMP is represented as a zero diagonal matrix with only off-diagonal terms, wherein the tracking module maximizes channel capacity for the plurality of users, and wherein the tracking module minimizes increase in transmit power of the xDSL system.

14. The system of claim 13, wherein the tracking module maximizes the channel capacity for the plurality of users to minimize variances in error data associated with each of the plurality of users.

15. The system of claim 13, wherein the initialization module learns characteristics of channels during showtime and with the ODMP not enabled.

16. The system of claim 13, wherein the tracking module is further configured to receive error data from each of the plurality of users, wherein the error data is used to calculate an updated ODMP, and wherein calculating the updated ODMP is performed without matrix inversion operations.

17. The system of claim 16, wherein the tracking module receives error data from the plurality of users via a low speed back channel with a bandwidth of approximately 128 kbps.

18. The system of claim 16, wherein the error data is based on 16-bit precision.

19. The system of claim 13, further comprising an incrementing module configured to add a new user to the xDSL system during showtime.

20. An off-diagonal MIMO precoder (ODMP) in an xDSL system for pre-compensating for downstream self-induced crosstalk (self-FEXT) comprising:

a learning module configured to learn CPE channel characteristics to obtain an initial ODMP;

a tracking module configured to update the initial ODMP during showtime to obtain an optimum ODMP by receiving error data over a low speed feedback channel and executing a least means square (LMS) adaptive algorithm, the tracking module further configured to maximize channel capacity for the CPE, the tracking module further configured to minimize increase in transmit power of the xDSL system; and an incrementing module configured to perform one of: add new CPE to the xDSL system and remove existing CPE from the xDSL system.

* * * * *